United States Patent
Yamaguchi et al.

(10) Patent No.: US 7,101,166 B2
(45) Date of Patent: Sep. 5, 2006

(54) APPARATUS FOR EXTRUDING CERAMIC MOLDING

(75) Inventors: Satoru Yamaguchi, Anjyo (JP); Yasunao Miura, Nagoya (JP)

(73) Assignee: Denso Corporation, (JP)

( * ) Notice: Subject to any disclaimer, the term of this patent is extended or adjusted under 35 U.S.C. 154(b) by 0 days.

(21) Appl. No.: 10/669,599

(22) Filed: Sep. 25, 2003

(65) Prior Publication Data

US 2004/0062828 A1    Apr. 1, 2004

(30) Foreign Application Priority Data

Sep. 27, 2002    (JP)    ............................. 2002-283918

(51) Int. Cl.
*B28B 17/02*    (2006.01)

(52) U.S. Cl. ...................... 425/208; 425/209; 425/380; 425/202; 425/376.1; 264/630; 264/632; 366/125; 366/83; 366/79; 366/88; 366/89; 366/90

(58) Field of Classification Search ................ 425/208, 425/198, 202, 209, 380, 376.1; 264/630, 264/632; 366/125, 83, 79, 88–90; B29C 47/10
See application file for complete search history.

(56) References Cited

U.S. PATENT DOCUMENTS

| | | | | |
|---|---|---|---|---|
| 4,171,196 A | * | 10/1979 | Maillefer | 425/209 |
| 4,227,870 A | * | 10/1980 | Kim | 425/208 |
| 4,400,218 A | * | 8/1983 | Koch et al. | 127/1 |
| 4,839,120 A | * | 6/1989 | Baba et al. | 264/102 |
| 5,127,741 A | * | 7/1992 | Capelle et al. | 366/80 |
| 5,393,213 A | * | 2/1995 | Murata et al. | 425/205 |
| 5,458,834 A | * | 10/1995 | Faber et al. | 264/109 |
| 5,607,636 A | * | 3/1997 | Ito et al. | 264/205 |
| 5,932,159 A | * | 8/1999 | Rauwendaal | 264/211.21 |
| 5,984,516 A | * | 11/1999 | Inoue et al. | 366/97 |
| 5,989,420 A | * | 11/1999 | Sugimoto | 210/222 |
| 6,074,084 A | * | 6/2000 | Kolossow | 366/84 |
| 6,136,246 A | * | 10/2000 | Rauwendaal et al. | 264/211.21 |
| 6,790,025 B1 | * | 9/2004 | Yamaguchi et al. | 425/198 |
| 2002/0014710 A1 | * | 2/2002 | Tsuruta et al. | 264/40.6 |
| 2003/0098530 A1 | * | 5/2003 | Inoguchi | 264/630 |

FOREIGN PATENT DOCUMENTS

| | | |
|---|---|---|
| CN | 2046431 U | 10/1989 |
| CN | 2328499 Y * | 7/1999 |
| JP | 54-145064 | 11/1979 |
| JP | 60-210420 | 10/1985 |
| JP | 2-14107 | 1/1990 |
| JP | 5-64809 | 3/1993 |
| JP | 5-177692 | 7/1993 |
| JP | 2000-238022 | 9/2000 |
| JP | 2001-17997 | 1/2001 |

* cited by examiner

*Primary Examiner*—Robert Davis
*Assistant Examiner*—G. Nagesh Rao
(74) *Attorney, Agent, or Firm*—Nixon & Vanderhye PC (57) ABSTRACT

The extruding apparatus has the molding die to form the ceramic molding, the screw extruder containing the extrusion screw to knead and guide the ceramic material toward the molding die. The extrusion screw is comprised of the pressure screw part and the diffusion screw part. The diffusion screw part provided at the front end of the extrusion screw has a diameter greater than the screw diameter of the pressure screw part.

16 Claims, 8 Drawing Sheets

APPARATUS FOR EXTRUDING CERAMIC MOLDING

BACKGROUND OF THE INVENTION

1. Field of the Invention

The present invention relates to an apparatus for extruding a ceramic molding having a honeycomb structure, etc.

2. Description of the Related Art

In recent years, a ceramic molding having a honeycomb structure comprised of a plurality of cells divided by partitions has been used as a catalyst carrier for treating the exhaust gas of an automobile.

To manufacture a ceramic molding with a honeycomb structure, an extrusion molding is generally performed by using a plunger or screw type of extruding apparatus.

Especially, the screw type extruding apparatus provided with an extrusion screw to knead and extrude a ceramic material into a molding die can successively produce ceramic moldings of honeycomb structure with high productivity.

However, the above conventional screw type extruding apparatus has the following problems. In the screw type extruding apparatus, the outer diameter of the ceramic molding which can be extruded is restricted in accordance with the diameter of the extrusion screw. It is difficult to extrude the ceramic molding of which the ratio of the outer diameter thereof to the screw diameter exceeds a predetermined value. In order to extrude a ceramic molding having such a large outer diameter, it is necessary to use a large extruding apparatus provided with an extrusion screw having a large diameter.

Especially, to extrude a ceramic molding having a honeycomb structure in which the cells are divided by thin partitions, it is preferable that the diameter of the ceramic molding be restricted to be approximately 0.7–0.8 times the screw diameter of the extrusion screw.

To extrude the ceramic molding mentioned above, the ceramic material must be uniformly distributed over the entire section of the ceramic molding. To this end, a resistance pipe whose diameter is reduced toward the molding die must be provided between an outlet side of the extrusion screw and the molding die. The resistance pipe can enhance the uniformity of the ceramic material due to a friction resistance generated between its inner peripheral wall and the ceramic material.

To maintain the pressure necessary for extrusion molding in the extrusion screw, the screw length must be increased in accordance with the screw diameter. That is, to manufacture a ceramic molding having a large diameter, a long extrusion screw having a large diameter is required. This is the reason that it is difficult to manufacture a ceramic molding having a large diameter using a small extruding apparatus.

SUMMARY OF THE INVENTION

The present invention is aimed at solving the above problems and at provision of a small extruding apparatus using which a ceramic molding having a large diameter can be extruded.

The present invention provides an apparatus for extruding a ceramic molding, comprising a molding die, to form a ceramic molding, and a screw extruder containing an extrusion screw to knead and guide a ceramic material toward the molding die, wherein the extrusion screw has a pressure screw part provided with a first lead of a single thread or more than one thread in the form of a spiral ridge, on an outer peripheral surface of a first shaft body and, on its front end, a diffusion screw part coaxial to the first shaft body and provided with a second lead of a single thread or more than one thread in the form of a spiral ridge on an outer peripheral surface of a second shaft body which rotates integrally with the first shaft body, and the diffusion screw part has a screw diameter larger than that of the pressure screw part.

Regarding the present invention, it is remarkable that the screw diameter of the diffusion screw part, i.e., a diameter of a locus circle of the second lead of the diffusion screw part in a rotating state is larger than the screw diameter of the pressure screw part and that the diffusion screw part having a large diameter is located at the front end of the extrusion screw.

In the extruding apparatus according to the present invention, a ceramic material is pressurized by the pressure screw part having a small diameter and is supplied to the molding die by the diffusion screw part having a large diameter so that the ceramic molding having a large diameter can be extruded. That is, the pressure screw part and the diffusion screw part have different roles in the extruding apparatus.

The pressure screw part is adapted to pressurize the ceramic material until a pressure necessary for extrusion molding is obtained. The diffusion screw part, provided at the front end of the extrusion screw, is adapted to uniformly supply the ceramic material to the molding die.

According to the above-mentioned extruding apparatus, it is only required that the pressure screw part can pressurize the ceramic material until a desired pressure is obtained. It is not necessary to increase the diameter of the pressure screw part in accordance with the outer diameter of the ceramic molding to be extruded. Also, it is not necessary to increase the length of the pressure screw part in order to compensate for a pressure drop of the ceramic material caused by an increase of the diameter of the pressure screw part.

Due to the diffusion screw part, the ceramic material can be uniformly supplied to the molding die and a high quality ceramic molding can be extruded.

As mentioned above, with the combination of the pressure screw part having a small diameter and the diffusion screw part having a large diameter, the ceramic material is pressurized by the pressure screw part and a ceramic molding having a large diameter can be obtained by extrusion through the diffusion screw part. Therefore, even if the ceramic molding having a large diameter is formed, it is not necessary to increase the diameter of the pressure screw part or to increase the length of the pressure screw part in accordance with an increase in diameter.

Consequently, the present invention can provide a small extruding apparatus in which a ceramic molding having a large diameter can be extruded.

According to the first embodiment of the invention mentioned above, the extrusion screw preferably has, between the pressure screw part and the diffusion screw part, a spreading part provided with a spreading lead for spreading the ceramic material from an inner peripheral side toward an outer peripheral side.

With this arrangement, the spreading part can positively move the ceramic material which has been supplied from the pressure screw part to the inner peripheral side of the spreading part, toward the outer peripheral side of the spreading part, by the spreading lead provided thereon.

By positively pushing the ceramic material from the inner peripheral side toward the outer peripheral side, the ceramic material can be smoothly advanced from the pressure screw part having a small diameter to the diffusion screw part having a large diameter.

Due to the spreading lead of the spreading part, the transition section, from the pressure screw part to the diffusion screw part, can be shortened thus leading to a decrease in the length of the extrusion screw.

Preferably, the spreading part is provided with the spreading lead that is continuously connected to each thread of the second lead of the diffusion screw part and that is spirally formed on an outer peripheral surface of the intermediate shaft body provided between the first shaft body and the second shaft body whose diameter is larger than that of the first shaft body.

The intermediate shaft body preferably has a diameter which is gradually increased from its first end connected to the first shaft body toward its second end connected to the second shaft body.

Due to the synergetic effect of the spreading lead of the spreading part and the outer peripheral surface of the intermediate shaft body whose diameter is gradually increased, the ceramic material supplied from the pressure screw having a small diameter to the inner peripheral side of the spreading part can be moved to the outer peripheral side thereof. Further, the ceramic material on the outer peripheral side of the spreading part can be supplied smoothly to the diffusion screw part.

Especially, as the spreading lead of the spreading part and the second lead of the diffusion screw part are continuously connected to each other, there is no possibility that the ceramic material stays therebetween and the spreading lead and the second lead can be effectively and integrally formed, thus resulting in the high productivity of the extrusion screws.

Also, in the spreading part, the spreading lead, of a substantially uniform shape in cross section in the axial direction, is connected to an end of each thread of the second lead, on the outer peripheral surface of the intermediate shaft body provided between the first shaft body and the second shaft body whose diameter is larger than that of the first shaft body.

The intermediate shaft body may have a diameter substantially equal to that of the first shaft body.

With this structure, the ceramic material on the inner peripheral side can be positively pushed toward the outer peripheral side by the spreading lead radially provided in the spreading part. The ceramic material which has been supplied by the pressure screw part having a small diameter can be smoothly supplied to the diffusion screw part having a large diameter.

It is preferable that the extrusion screw be accommodated in a screw housing which has a hollow, small diameter tube of a substantially circular cross section receiving the pressure screw part, a hollow, large diameter tube of a substantially circular cross section whose diameter is larger than that of the small diameter tube, receiving the diffusion screw part and the spreading part, and an spreading wall surface connecting an inner peripheral surface of the small diameter tube and an inner peripheral surface of the large diameter tube, and that a lead end of the spreading lead of the spreading part, located on the spreading wall surface side, rotate, while maintaining a predetermined distance from the spreading wall surface in the radial direction.

With this structure, the ceramic material is prevented from staying around an inlet of the large diameter tube, especially in the vicinity of the spreading wall surface, so that the ceramic molding can be extruded with high uniformity. In addition, troubles, such as biting-in of the extrusion screw or clogging in the molding die, etc., which would otherwise be caused by re-flowing of the remaining ceramic material can be avoided.

The spreading wall surface is preferably defined by a plane substantially orthogonal to the axial direction of the extrusion screw.

With this structure, the extruding apparatus can be miniaturized by minimizing the length of the spreading part in the axial direction.

If the spreading wall surface is defined by a taper surface which gradually increases the diameter, the overall length of the extrusion screw is increased but the ceramic material can be moved more smoothly in the spreading part.

Also, it is preferable that the length from the rear end of the spreading part to the front end of the diffusion screw part be 0.7–1.5 times as long as the screw diameter of the diffusion screw part.

With this structure, the portion comprised of the diffusion screw part and the spreading part can have a sufficient length, thus leading to uniform extrusion of the ceramic material from the diffusion screw part.

If the length of the portion comprised of the diffusion screw part and the spreading part in the axial direction is less than 0.7 times the screw diameter of the diffusion screw part, the spreading and the diffusion of the ceramic material cannot be performed sufficiently and non-uniform distribution of the ceramic material over the entire section of the ceramic molding may be obtained.

If the length of the portion comprised of the diffusion screw part and the spreading part in the axial direction is more than 1.5 times the screw diameter of the diffusion screw part, the drive torque of the portion comprised of the diffusion screw part and the spreading part is so large that the pressure screw part which transmits the drive torque is damaged.

It is preferable that the length of the spreading part in the axial direction be 0.15–0.5 times the screw diameter of the diffusion screw part.

With this structure, the spreading part can provide an appropriate size of passage through which the ceramic material can move more smoothly from the inner peripheral side toward the outer peripheral side.

If the length of the spreading part in the axial direction is less than 0.15 times the screw diameter of the diffusion screw part, the spreading part cannot provide a sufficient passage for the ceramic material and, thus, it is possible that the ceramic material cannot be moved smoothly therethrough.

If the length of the spreading part in the axial direction exceeds 0.5 times the screw diameter of the diffusion screw part, the length of the diffusion screw part in the axial direction is decreased accordingly, so that sufficient diffusion of the ceramic material may not be performed at the diffusion screw part.

Also, the outer diameter of the ceramic molding which can be extruded is preferably 0.35–0.8 times the screw diameter of the diffusion screw part.

With this structure, the diameter is reduced appropriately from the diffusion screw part toward the molding die, so that the ceramic material can be extruded uniformly, due to the friction resistance caused by the reduction in diameter.

If the outer diameter of the ceramic molding is less than 0.35 times the screw diameter of the diffusion screw part, there it is possible that the advantages expected by making the screw diameter of the diffusion screw part larger than the screw diameter of the pressure screw part are sacrificed.

If the outer diameter of the ceramic molding is more than 0.8 times the screw diameter of the diffusion screw part, there is a possibility that the ceramic material is not supplied to the molding die with high uniformity.

The screw diameter of the diffusion screw part is preferably greater than the screw diameter of the pressure screw diameter but smaller than 3.0 times the screw diameter thereof.

With this structure, the ceramic material can be smoothly advanced from the pressure screw part toward the diffusion screw part, and the ceramic molding having a large diameter can be extruded without being restricted by the screw diameter of the pressure screw part.

If the screw diameter of the diffusion screw part is not larger than the screw diameter of the pressure screw part, the effect of the present invention, that the ceramic molding having a diameter greater than the maximum diameter which can be extruded by the screw diameter of the pressure screw diameter can be extruded, may not be achieved.

If the screw diameter of the diffusion screw part is not less than 3.0 times the screw diameter of the pressure screw part, there is a fear that the drive torque for rotating the diffusion screw part is extremely large, thus resulting in excessive load exerted on the pressure screw part.

In the extrusion screw, at least one of the diffusion screw part, the spreading part and the pressure screw part is preferably made of a piece separate from the remaining components.

With this structure, the extrusion screws can be effectively manufactured. Also, as each part of the extrusion screw is replaceable, the applicability and the maintenance efficiency of the extruding apparatus can be enhanced.

A shaft bearing of a substantially circular cross section is preferably provided on the front end side of the pressure screw part and is connected to the pressure screw part.

With this structure, the extrusion screw provided on its front end with the diffusion screw part having a large diameter and the spreading part can be properly supported. Due to the extrusion screw supported by the shaft bearing, no trouble, such as decentering, etc., occurs and the durability of the apparatus can be enhanced.

The second lead is preferably comprised of an even number of threads.

The second lead is symmetrical in any section of the diffusion screw part in the axial direction. Due to the second lead being in a symmetrical arrangement, there is no or little fear that a force, in a direction to deviate the axis of the diffusion screw part, is produced. Consequently, an occurrence of a problem such as axial nonalignment of the extrusion screw, can be prevented.

The second shaft body of the diffusion screw part is preferably provided at least at a front end in the axial direction, with the diameter reducing part, whose diameter is reduced, toward its front end.

With this structure, the ceramic material is moved further smoothly in the vicinity of the front end of the diffusion screw part, so that the ceramic molding can be more highly uniformly extruded.

It is preferable that the ceramic molding have a honeycomb structure.

In case of a honeycomb molding, the ceramic material must be supplied with extremely high uniformity to the molding die. If the ceramic material supplied by the extrusion screw is not uniform enough, the quality of the ceramic molding could be lowered. Especially, the dimensional relationship between the screw diameter of the extrusion screw and the diameter of the ceramic molding extruded by the molding die is very restricted.

Accordingly, a combination of the pressure screw part having a small diameter and the diffusion screw part having a large diameter particularly can enhance the effect, of the present invention, that the high quality ceramic molding having a large diameter can be extruded.

The tapered resistance pipe whose inner diameter is reduced toward the molding die is preferably provided between the screw extruder and the molding die.

With this structure, the ceramic material which has been supplied from the extrusion screw to the molding die can be made more uniform in the resistance pipe. That is, due to the friction resistance between the tapered inner peripheral surface of the resistance pipe and the ceramic material and the internal friction of the ceramic materials, in accordance with the decrease in the passage area, etc., the uniformity can be enhanced.

Therefore, by the extruding apparatus provided with the resistance pipe, a ceramic molding of extremely high quality can be extruded. Especially, when the ceramic molding has a honeycomb structure, the ceramic material can be distributed uniformly in any section of the ceramic molding and there is no fear of distortion between the partitions which define a honeycomb.

The present invention may be more fully understood from the description of preferred embodiments of the invention set forth below, together with the accompanying drawings.

DESCRIPTION OF PREFERRED EMBODIMENTS

Embodiment 1 will be explained first. The extruding apparatus according to the embodiments of the present invention will be explained with reference to FIGS. 1–3.

Figure 1:
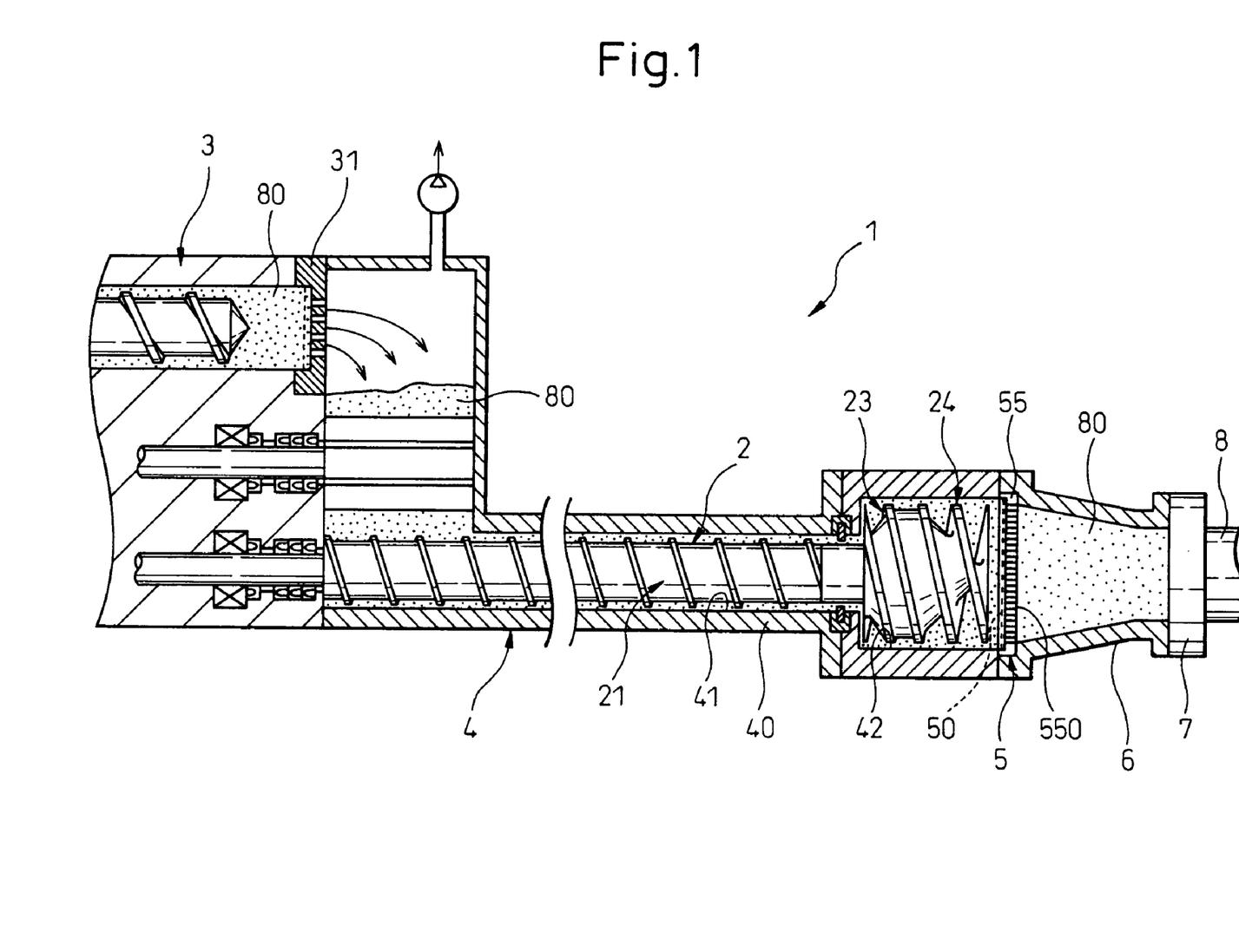
FIG. 1 is a sectional view of an extruding apparatus according to Embodiment 1.

As shown in FIG. 1, the extruding apparatus 1 of the present embodiment has the molding die 7 for forming the ceramic molding 8 and the screw extruder 4 containing the extrusion screw 2 to knead and guide the ceramic material 80 toward the molding die 7.

The extrusion screw 2 is provided with the pressure screw part 21 and, at its front end, with the diffusion screw part 24.

Figure 3:
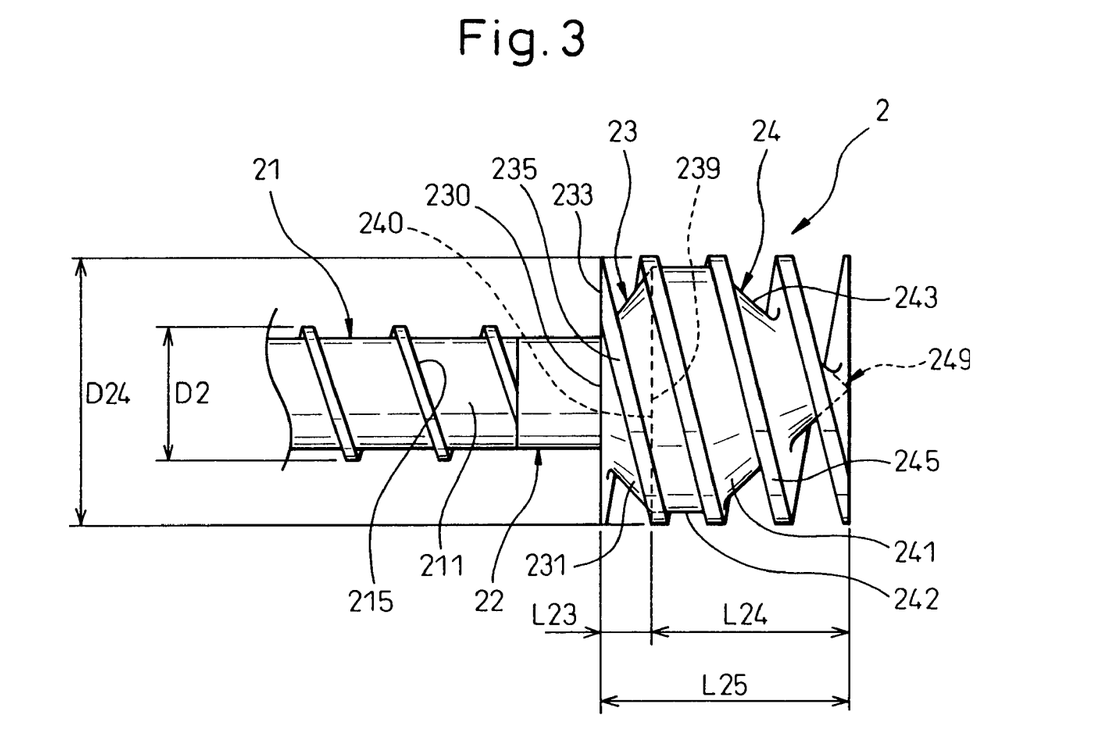
FIG. 3 is a side view of an extrusion screw according to Embodiment 1.

As shown in FIG. 3, the pressure screw part 21 is provided with a first lead 215 of a single thread or more than one thread in the form of a spiral ridge, on an outer peripheral surface of the first shaft body 211.

The diffusion screw part 24 is located coaxially to the first shaft body 211 and is provided with the second lead 245 of two threads in the form of a spiral ridge on an outer peripheral surface of the second shaft body 241 which rotates integrally with the first shaft body.

The diffusion screw part 24 has a screw diameter greater than that of the pressure screw part 21.

With this regard, the details will be explained below.

Figure 4:
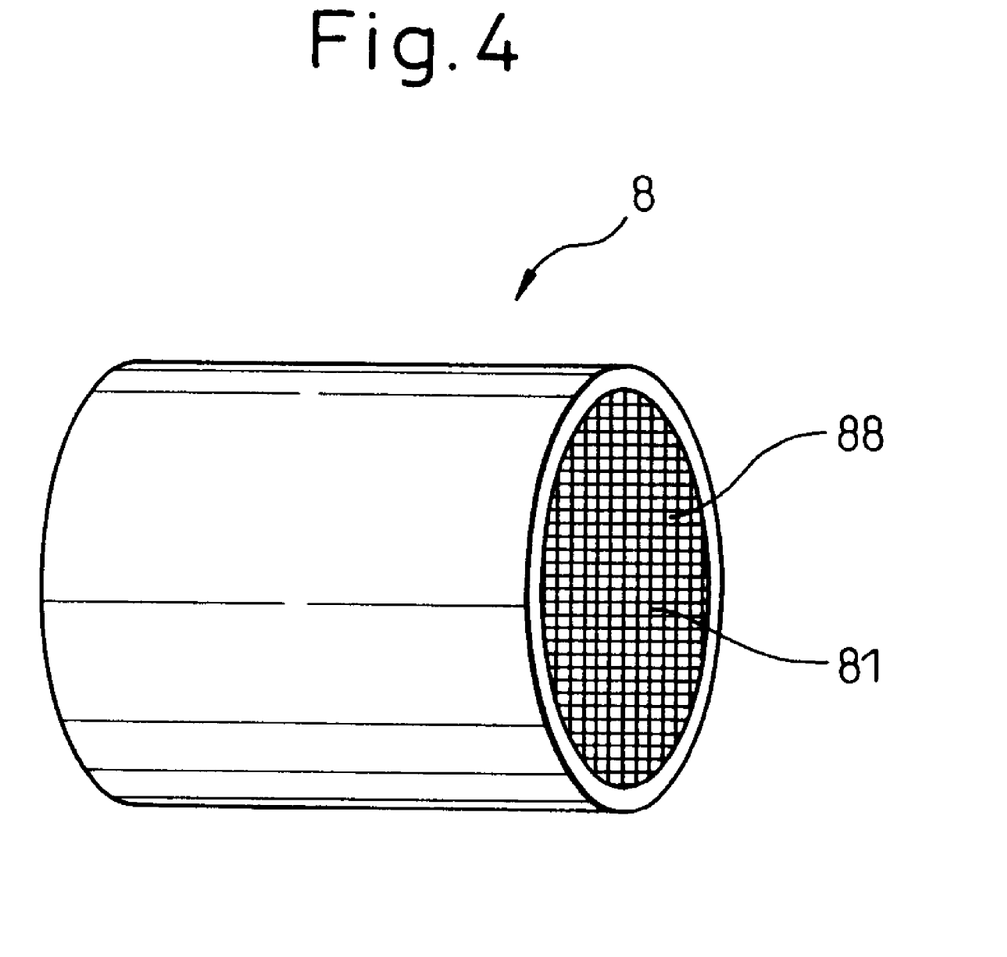
FIG. 4 is a perspective view of a honeycomb molding according to Embodiment 1.

The ceramic molding 8 extruded in the present embodiment, as shown in FIG. 4, has a honeycomb structure and is used as a catalyst carrier in an exhaust gas purification device for an automobile.

The honeycomb structure is a substantially cylindrical ceramic molding comprised of a large number of cells 88 partitioned by the ceramic partition walls 81. Especially, the ceramic molding 8 of this embodiment has a diameter of 250 mm and is comprised of the thin partition walls 31 of 75 μm, to reduce the exhaust gas flow resistance as a honeycomb structure, while maintaining the high purification efficiency.

The extruding apparatus 1 which extrudes the ceramic molding 8 of the present embodiment, as shown in FIG. 1, has two screw extruders 3 and 4. The ceramic material 80 which has been supplied to the upper screw extruder 3 can be kneaded and moved, by the upper screw extruder 3, to the lower screw extruder 4 through a filter 31.

The extruding apparatus 1 may have a single screw extruder or more than two screw extruders.

Figure 2:
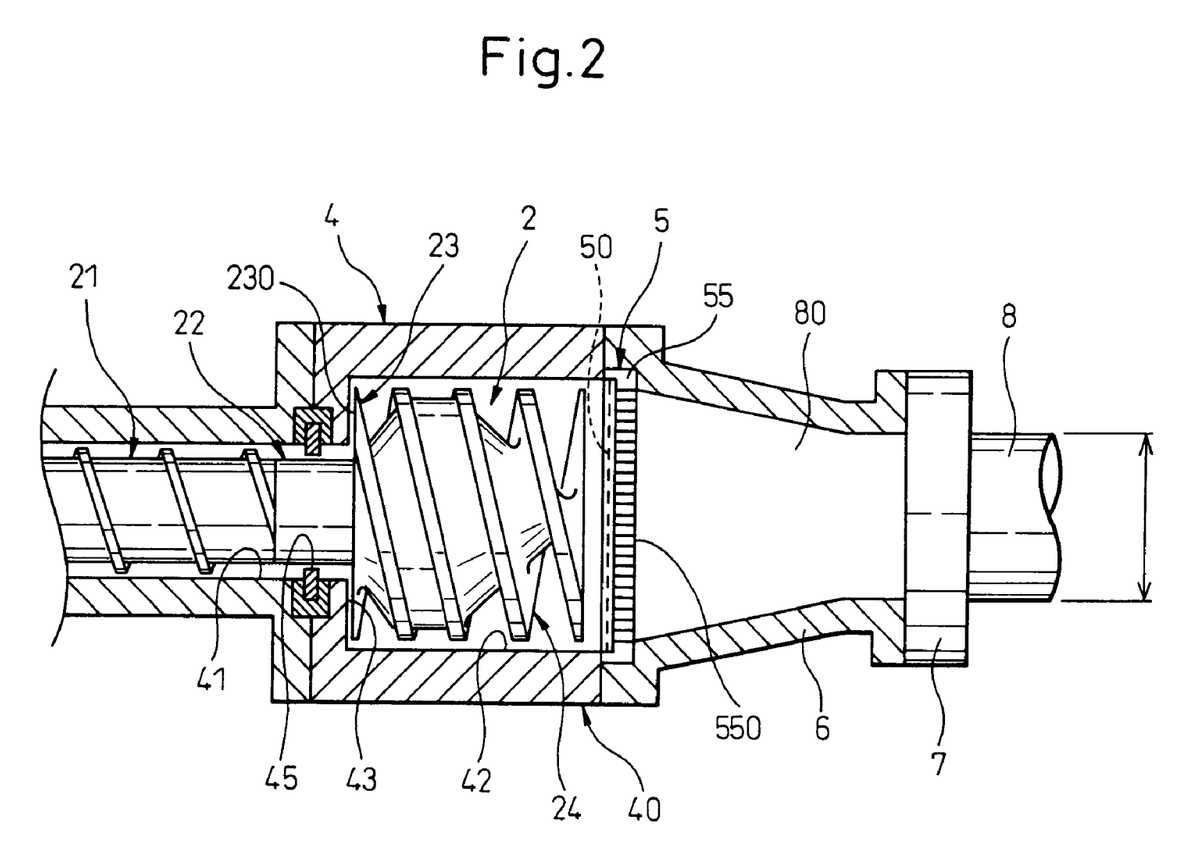
FIG. 2 is a sectional view of a screw extruder according to Embodiment 1.

As shown in FIG. 2, the extruding apparatus 1 is provided at the lower portion with the molding die 7 for forming the ceramic material 80, the screw extruder 4 for supplying the ceramic material 80 to the molding die 7, a filter device 5 for filtering the ceramic material 80 and the resistance pipe 6 to enhance the uniformity of the ceramic material 80.

As shown in FIG. 2, the molding die 7 is adapted to form the ceramic material 80 supplied thereto into a ceramic molding 8. The resistance pipe 6 having a through, hollow portion of a substantially circular cross section and an inner diameter which is reduced gradually from the screw extruder 4 side toward the molding die 7 side is provided between the molding die 7 and the screw extruder 4. In the present embodiment, the inner diameters of the resistance pipe 6 on the screw extruder 4 side and on the molding die 7 side are 402 mm and 265 mm, respectively.

As shown in FIG. 2, the filter device 5 is comprised of a filter mesh 50 and a supporting member 55 for supporting the filter mesh 50. The supporting member 55 is made of metal and is provided with a large number of through holes 550 through which the ceramic material 80 passes. The filter mesh 50 is made of stranded stainless-steel thin wires.

Regarding the screw extruder 4, as shown in FIG. 2, the extrusion screw 2 is accommodated in the screw housing 40 which has a through, hollow part substantially in the form of a stepped cylinder comprised of a small diameter tube 41 and a large diameter tube 42.

As shown in FIG. 3, the extrusion screw 2 has the pressure screw part 21 whose screw diameter D2 is 200 mm, accommodated in the small diameter tube 41, and the diffusion screw part 24 whose screw diameter D24 is 400 mm, accommodated in the large diameter tube 42 and provided at the front end of the extrusion screw 2. In the present embodiment, the length L24 of the diffusion screw part 24 in the axial direction is 270 mm.

The extrusion screw 2 of the present embodiment, as shown in FIG. 3, has, between the pressure screw part 21 and the diffusion screw part 24, the spreading part 23 provided with the spreading lead 235 for spreading the ceramic material 80 from an inner peripheral side toward an outer peripheral side. In the present embodiment, the spreading part 23 has a length L23 of 80 mm, in the axial direction, and a screw diameter substantially equal to that of the diffusion screw diameter 24. In the present embodiment, the length L25 of the portion comprised of the spreading part 23 and the diffusion screw part 24 in the axial direction is 350 mm.

In the pressure screw part 21, as shown in FIG. 3, the first lead 215 of a single thread is spirally provided on the outer peripheral surface of the first shaft body 211 which is a rotating shaft having a diameter of 170 mm. In the pressure screw part 21, the ceramic material 80 is pressurized and advanced to the molding die 7 by the first lead 215.

As shown in FIG. 2, the first shaft body 211 is provided at its end on the molding die 7 side, with the shaft bearing 22 of a substantially circular cross section. The extrusion screw 2 is supported by a shaft bearing pin 45, which will be discussed hereinafter, provided on the outer periphery of the shaft bearing 22.

In the diffusion screw part 24, as shown in FIG. 3, the second lead 245 of two threads is spirally provided in the axial direction on the outer peripheral surface of the second shaft body 241 located coaxially with the first shaft body 211. The diffusion screw part 24 kneads and diffuses the ceramic material 80 using the second lead 245 so that the ceramic material 80 can be uniformly supplied to the molding die 7.

As shown in FIG. 3, the second shaft body 241 of the diffusion screw part 24 is provided, at its end located on the pressure screw part 21 side, with a connecting end 240 having a diameter of 350 mm, which is larger than the first shaft body 211 of the pressure screw part 21. The second shaft body 241 is provided, at its front end, with the diameter reducing part 243 whose imaginary extension terminates at a point 249 having no sectional area, adjacent to the molding die.

As shown in FIG. 3, the second shaft body 241 is comprised of a cylindrical part 242 having a substantially uniform diameter, extending to the connecting end 240, and a diameter reducing part 243 having a tapered outer peripheral surface whose imaginary extension terminates at the point 249. The diffusion screw part 24 feeds the ceramic material forward along the tapered outer periphery of the diameter reducing part 243 so that the ceramic material can be uniformly extruded.

In the spreading part 23, as shown in FIG. 3, the spreading lead 235 continuously connected to each thread of the second lead 245 of the diffusion screw part 24 is spirally provided on the outer peripheral surface of the intermediate shaft body 231 which rotates integrally with the first shaft body 211 of the pressure screw part 21.

In the spreading lead 235, as shown in FIGS. 2 and 3, the lead end 233 located on the pressure screw part 21 side rotates along the spreading wall surface 43 of a screw housing 40 which will be hereinafter described.

As shown in FIG. 3, both ends of the intermediate shaft body 231 of the spreading part 23 are connected to the first shaft body 211 and the connecting end 240 of the second shaft body having a diameter larger than the first shaft body.

The first end 230 connected to the first shaft body 211 has a diameter substantially equal to that of the first shaft body 211. The second end 239 connected to the second shaft body 241 of the diffusion screw part 24 has a diameter substantially equal to that of the connecting end 240 of the second shaft body 241.

That is, as shown in FIG. 3, the intermediate shaft body 231 has the tapered outer peripheral surface whose diameter is increased from the first end 230 toward the second end 239.

With this structure, the spreading part 23 whose diameter is increased from the pressure screw part 21 toward the diffusion screw part 24 can move the ceramic material smoothly while spreading the same radially and outwardly, due to the synergetic effect of the spreading lead 235 and the tapered outer peripheral surface of the intermediate shaft body 231.

As shown in FIG. 2, the screw housing 40 is comprised of the small diameter tube 41 having an inner diameter of 102 mm in which the pressure screw part 21 is accommodated, and the large diameter tube 42 substantially in the form of a cylinder having an inner diameter of 402 mm in which the diffusion screw part 24 and the spreading part 23 are accommodated. An inner peripheral surface of the small diameter tube 41 is connected to the large diameter tube 42 through the spreading wall surface 43 substantially orthogonal to the axial direction.

As described above, the lead end 233 of the spreading lead 235 rotates along the spreading wall surface 43 (see FIGS. 2 and 3). In this embodiment, the lead end 233 and the spreading wall surface 43 are spaced from each other at a distance of approximate 1 mm.

As shown in FIG. 2, the small diameter tube 41 is provided, at its end close to the large diameter tube 42, with shaft bearing pins 45 for supporting a shaft bearing 22 of the extrusion screw 2 which will be described hereinafter. The shaft bearing pins 45 are located on the inner peripheral surface of the small diameter tube 41 at an angular interval of 60° in the circumferential direction. The shaft bearing pins 45 project in the radial direction, with the front ends being spaced from the outer peripheral surface of the shaft bearing 22 which will be described hereinafter, at a predetermined distance.

Next, forming the ceramic molding 8, in the extruding apparatus 1 as above constructed, will be explained.

When the ceramic molding 8 is extruded in the extruding apparatus 1 of the present embodiment, as shown in FIG. 1, the ceramic material 80 which has been kneaded by the upper screw extruder 3 is supplied to the upstream side of the lower screw extruder 4. The ceramic material 80 is pressurized by the first lead 215 of the pressure screw part 21, and moved toward the spreading part 23.

As shown in FIGS. 2 and 3, the spreading part 23 moves the ceramic material 80 further forward by the spreading lead 235 and pushes the same along the tapered outer peripheral surface of the intermediate shaft body 231, toward the outer peripheral side. Thus, the spreading part 23 can move the ceramic material 80 which has been supplied from the pressure screw part 21 to the inner peripheral side of the spreading part 23, toward the outer peripheral side of the spreading part 23. Further, the ceramic material 80 on the outer peripheral side of the spreading part 23 can be supplied to the diffusion screw part 24.

The lead end 233 of the spreading lead 235, located on the pressure screw part 21 side, rotates along the spreading wall surface 43 of the screw housing 40, as shown in FIG. 2. Thus, in the spreading part 23, the ceramic material 80 can be supplied smoothly to the diffusion screw part 24.

The diffusion screw part 24 kneads and diffuses the ceramic material 80 so that the uniformity thereof can be enhanced. As shown in FIG. 2, by the diameter reducing part 243 on the molding die 7 side of the second shaft body 241, the ceramic material 80 can be pushed toward the filter device 5 while maintaining the uniformity thereof. In the filter device 5, the ceramic material 80 can be filtered by removing a mixed foreign matter, etc. therein.

The filtered ceramic material 80 is thereafter introduced into the resistance pipe 6. In the resistance pipe 6, due to the friction resistance between its inner peripheral surface and the ceramic material 80 and the flow resistance of the ceramic material 80 caused by the decrease in the passage sectional area, the uniformity of the ceramic material 80 can be further increased.

In the molding die 7, the highly uniform ceramic material 80 supplied thereto can be extruded into the ceramic molding 8 having a diameter of 250 mm and a honeycomb structure in which thin partition walls 81 in the form of a honeycomb is provided, as shown in FIG. 4.

As described above, in the extruding apparatus 1 of the present embodiment, the ceramic molding 8 having a diameter of 250 mm which is larger than the screw diameter of the pressure screw part 21 can be obtained by extrusion.

Therefore, when the ceramic molding 8 having a diameter of 250 mm is manufactured according to the present embodiment, it is necessary neither to make the screw diameter of the pressure screw part 21 larger than the diameter of the ceramic molding 8, nor to increase the length of the pressure screw part 21 in accordance with an increase of the diameter of the pressure screw part 21.

Consequently, in the extruding apparatus 1, the ceramic molding 8 having a large diameter can be extruded by a small apparatus which does not require an increase in the diameter and the overall length of the pressure screw part 21.

The ceramic material 80 which has been supplied to the molding die 7 is fully kneaded and diffused by the spreading part 23 and the diffusion screw part 24 to enhance the uniformity thereof. Therefore, the extruded ceramic molding 8 has high uniformity and high quality. Even if the honeycomb partition wall 81 is thin, i.e., 75 μm, there is little possibility that deformations due to distortion, etc. occurs.

Figure 5:
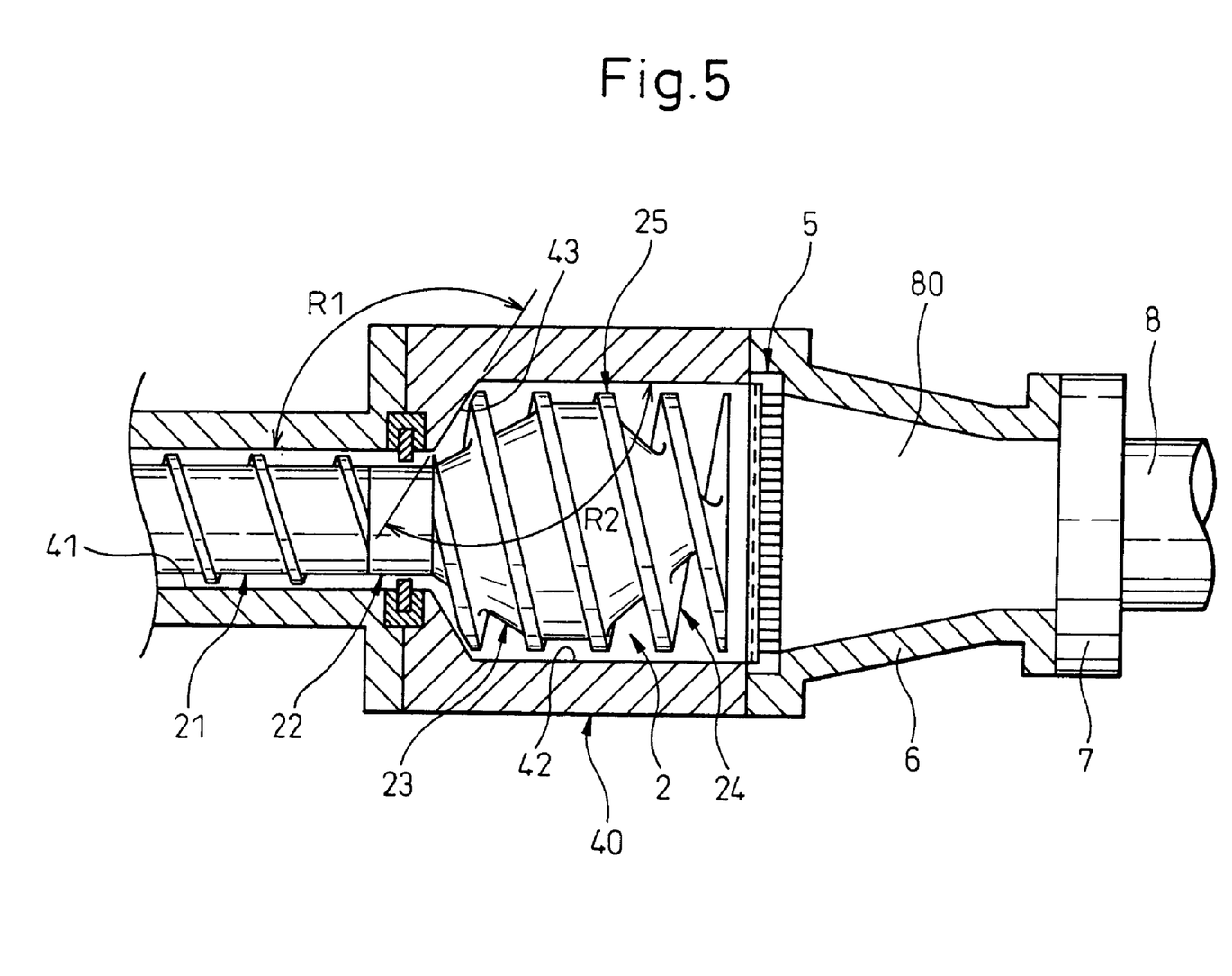
FIG. 5 is a sectional view of another screw extruder according to Embodiment 1.

In the screw housing 40, the spreading wall surface 43 defined by a shoulder between the small diameter tube 41 and the large diameter tube 42 may be a tapered surface, as shown in FIG. 5, and the lead end 230 of the spreading part 23 may extend along the spreading wall surface 43.

With this structure, the angle R1 defined between the spreading wall surface 43 and the inner peripheral surface of the small diameter tube 41, and the angle R2 defined between the spreading wall surface 43 and the inner peripheral surface of the large diameter tube 42 can be obtuse. The ceramic material can be moved more smoothly at the corner in the interior of the screw housing 40, though the overall length of the spreading part 23 is disadvantageously increased.

Next, Embodiment 2 will be explained. In this embodiment, the shape of the spreading part in the extruding apparatus of Embodiment 1 is modified.

Figure 6:
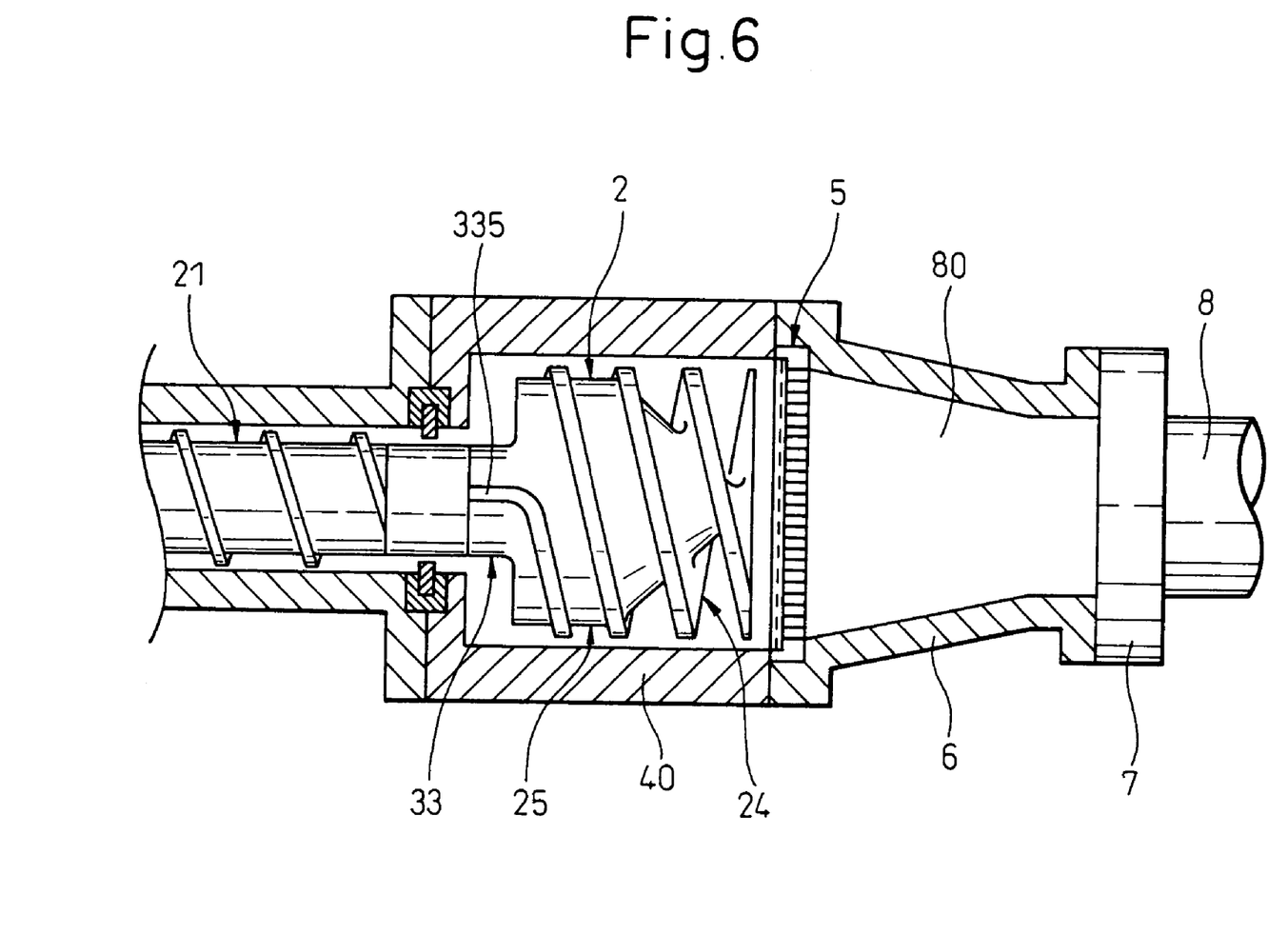
FIG. 6 is a sectional view of a screw extruder according to Embodiment 2.
Figure 7:
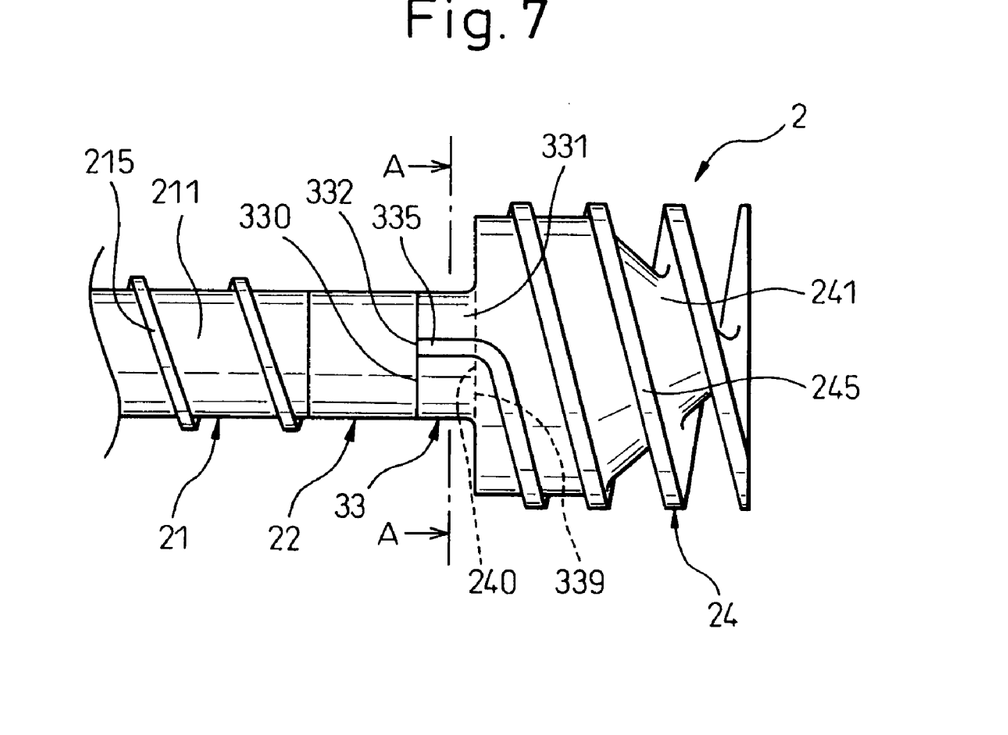
FIG. 7 is a side view of an extrusion screw according to Embodiment 2.
Figure 8:
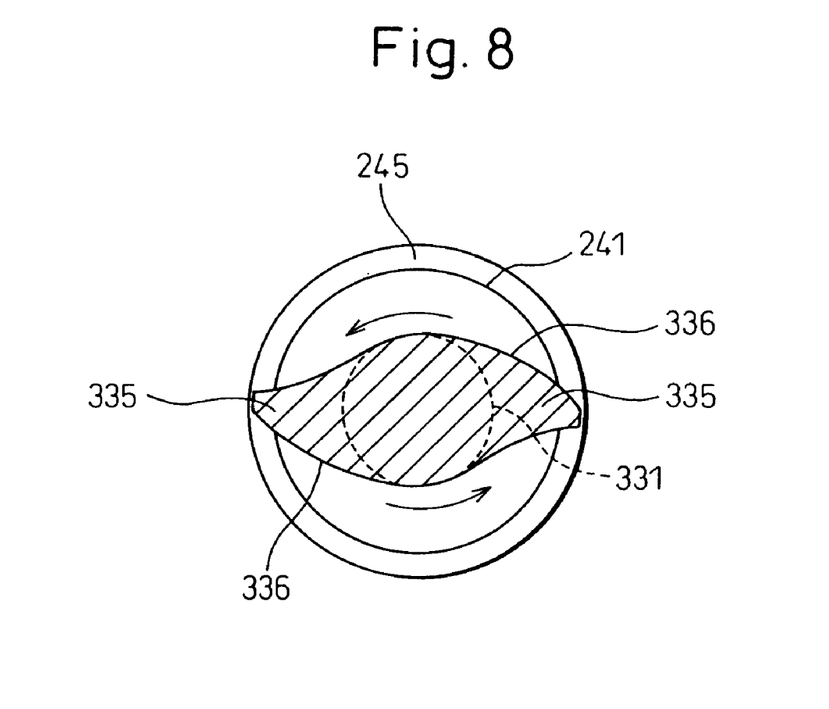
FIG. 8 is a sectional view taken along the line A—A of the extrusion screw shown in FIG. 7, according to Embodiment 2.

In the spreading part 33 of the present embodiment, as shown in FIGS. 6 through 8, the spreading lead 335 is provided on the outer peripheral surface of the intermediate shaft body 331 which rotates integrally with the first shaft body 211 of the pressure screw part 21. The spreading lead 335 is connected to an end of each thread of the second lead 245 of the diffusion screw part 24 and has a substantially uniform shape in cross section in the axial direction.

The first end 330 of the intermediate shaft body 331, located on the first shaft body 211 side, has a diameter substantially equal to that of the first shaft body 211. The second end 339 located on the second shaft body 241 side has a diameter substantially equal to the rear end of the second shaft body 241.

Namely, as shown in FIGS. 7 and 8, the spreading lead 335 has a sectional shape substantially identical to that of the end surface of the second lead 245 at the connecting end 240 of the diffusion screw part 24 and extends in the axial direction. Thus, extrusion surfaces 336 of the spreading lead 335 extend substantially in parallel with the axial direction.

In order to move the ceramic material 80 from the inner peripheral side toward the outer peripheral side at the spreading part 33, the extrusion surface 336 of the spreading lead 335 is curved so that the portion close to the inner peripheral side is located forward (the phase is advanced) in the rotating direction, and the portion close to the outer peripheral side is located rearward (the phase is retarded) in the rotating direction, as shown in FIG. 8.

The spreading lead 335 of the spreading part 33 can certainly force the ceramic material 80 outward along the extrusion surface 336, from the inner peripheral side toward the outer peripheral surface, and certainly supply the same to the diffusion screw part 24 having a large diameter.

Other structures, operations and effects of the present embodiment are identical to those of Embodiment 1.

Lastly, Embodiment 3 will be explained. In this embodiment, the structure of the extrusion screw in the extruding apparatus of Embodiment 1 is modified.

Figure 9:
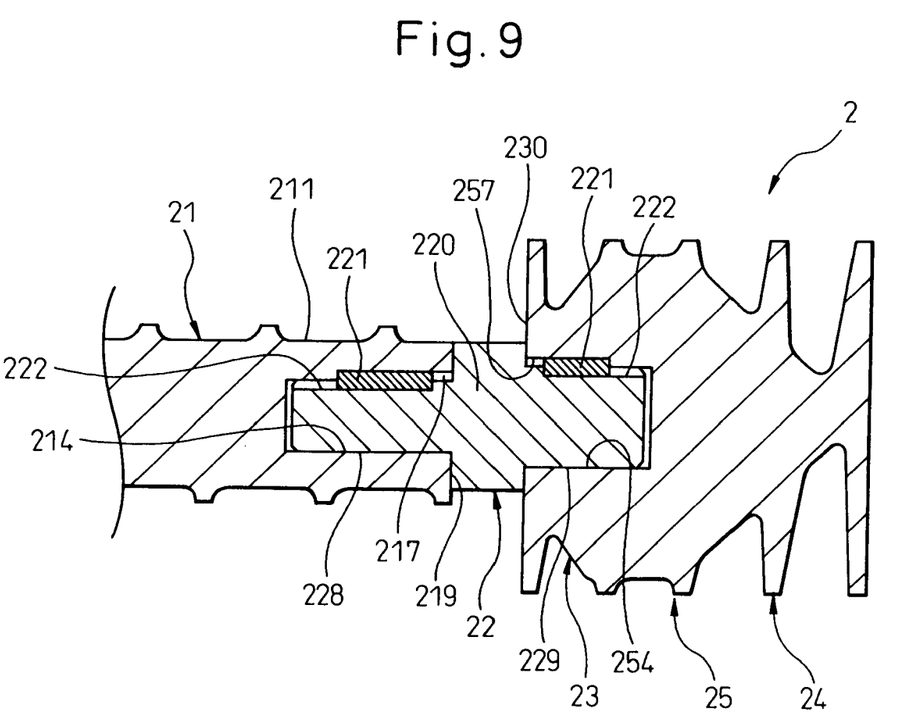
FIG. 9 is a sectional view of an extrusion screw according to Embodiment 3.

Unlike the integrally molded extrusion screw in Embodiment 1, the extrusion screw 2 of this embodiment is comprised of three separate pieces.

Namely, as shown in FIG. 9, the extrusion screw 2 of the present embodiment is comprised of a pressure screw part 21, a diameter increasing screw part 25 comprised of the spreading part 23 and the diffusion screw part 24, and a joint 220 which constitutes the shaft bearing 22.

The pressure screw part 21 and the diameter increasing screw part 25 are provided on their ends 219 and 230 opposed to each other, with recesses 214 and 254 substantially in the form of a cylinder, extending from the end surfaces in the axial direction. Further, key ways 217 and 257 into which keys 221 are fitted, are provided in the inner peripheral surfaces of the recesses 214 and 254 in the axial direction.

The joint 220 has, on its opposite ends, inserting portions 228 and 229 whose diameter is smaller than that of the first shaft body 211, and, between the inserting portions 228 and 229, the shaft bearing 22 having a diameter substantially equal to that of the first shaft body 211. The shaft bearing 22 has a smooth outer peripheral surface of a substantially circular cross section, to serve as a shaft bearing of the extrusion screw 2. Axial key ways 222 into which keys 221 are fitted, are provided on the outer peripheral surfaces of the inserting portions 228 and 229.

The pressure screw part 21 and the joint 220 are connected to each other through the key 221, by inserting the inserting portion 228 of the joint 220 in the recess 214 of the pressure screw part 21. Also, the diameter increasing screw part 25 and the joint 220 are connected to each other through the key 221, by inserting the inserting portion 229 of the joint 220 in the recess 254 of the diameter increasing screw part 25.

The pressure screw part 21 and the diameter increasing screw part 25 are secured to the joint 220 through a bolt and a setscrew (not shown) to prevent the inserting portions 228 and 229 from being disengaged.

In the extruding apparatus 1 of the present embodiment, the extrusion screw 2 is comprised of separate members, i.e., the pressure screw part 21, the joint 220 and the diameter increasing screw 25.

With this structure, if a trouble occurs at any of the members of the extrusion screw 2, only a defective member can be efficiently replaced without exchanging the entirety of the extrusion screw 2. If the diameter increasing screw part 25 is changed, the ceramic moldings 8 of various specifications, for example, having different diameters can be extruded without modifying the extruding apparatus.

The structure, the operation and the effect of the present embodiment are identical to those of Embodiment 1.

The structure of the present embodiment can be applied to the extrusion screw of Embodiment 2.

Though the present embodiment is applied to, by way of example, a three-piece structure type extrusion screw, the present invention can be applied to a two-piece or four-piece structure type.

While the invention has been described by reference to specific embodiments chosen for purposes of illustration, it should be apparent that numerous modifications could be made thereto by those skilled in the art without departing from the basic concept and scope of the invention.

The invention claimed is:

1. An apparatus for extruding a ceramic molding, comprising:
   a molding die, to form a ceramic molding, and
   a screw extruder containing an extrusion screw to knead and guide a ceramic material toward the molding die,
   wherein said extrusion screw has a pressure screw part provided with a first lead of at least one thread in the form of a spiral ridge, on an outer peripheral surface of a first shaft body and, on a downstream end, a diffusion screw part coaxial to the first shaft body and provided with a second lead of at least one thread in the form of a spiral ridge on an outer peripheral surface of a second shaft body which rotates integrally with the first shaft body,
   wherein said diffusion screw part has a diameter larger than that of the pressure screw part, and
   wherein said second shaft body of the diffusion screw part has, at least at its downstream end in the axial direction, a diameter reducing part that is tapered so that its diameter reduces to its downstream end, said second lead extending along said diameter reducing part.

2. An apparatus for extruding a ceramic molding as in claim 1, wherein said extrusion screw has, between the pressure screw part and the diffusion screw part, a spreading part provided with a spreading lead for spreading the ceramic material in a radially outward direction.

3. An apparatus for extruding a ceramic molding as in claim 2, wherein:
   said spreading part is provided with a spreading lead that is continuously connected to each thread of the second lead and that is spirally formed on an outer peripheral surface of an intermediate shaft body provided between the first shaft body and the second shaft body whose diameter is larger than that of the first shaft body,
   said intermediate shaft body having a diameter which is gradually increased from its first end connected to the first shaft body toward its second end connected to the second shaft body.

4. An apparatus for extruding a ceramic molding as in claim 2, wherein:
   said spreading lead has a substantially uniform shape in cross section in the axial direction, and is connected to an end of each thread of the second lead, on an outer peripheral surface of an intermediate shaft body provided between the first shaft body and the second shaft body having a diameter larger than that of the first shaft body, said intermediate shaft body having a diameter substantially equal to that of the first shaft body.

5. An apparatus for extruding a ceramic molding as in claim 2, wherein:

said extrusion screw is accommodated in a screw housing which has (a) a hollow small diameter tube of a substantially circular cross section receiving the pressure screw part, (b) a hollow large diameter tube of substantially circular cross section having a diameter larger than that of the small diameter tube, receiving the diffusion screw part and the spreading part, and (c) a spreading wall surface connecting an inner peripheral surface of the small diameter tube and an inner peripheral surface of the large diameter tube, and a lead end of the spreading lead located on the spreading wall surface side, rotates while maintaining a predetermined distance from the spreading wall surface in the radial direction.

6. An apparatus for extruding a ceramic molding as in claim 5, said spreading wall surface being defined by a plane substantially orthogonal to the axial direction of the extrusion screw.

7. An apparatus for extruding a ceramic molding as in claim 2, wherein the length from a rear end of the spreading part to a front end of the diffusion screw part is 0.7–1.5 times as long as the screw diameter of the diffusion screw part.

8. An apparatus for extruding a ceramic molding as in claim 2, wherein the length of the spreading part in the axial direction is 0.15–0.5 times as long as the screw diameter of the diffusion screw part.

9. An apparatus for extruding a ceramic molding as in claim 2, wherein the molding die has a molding outlet configured so that an outer diameter of the extruded ceramic molding is 0.35–0.8 times as large as the screw diameter of the diffusion screw.

10. An apparatus for extruding a ceramic molding as in claim 2, wherein the screw diameter of the diffusion screw is greater than the screw diameter of the pressure screw part but smaller than 3.0 times the diameter thereof.

11. An apparatus for extruding a ceramic molding as in claim 2, wherein at least one of the diffusion screw part, the spreading part, and the pressure screw part of the extrusion screw is made of a piece separate from the remaining parts.

12. An apparatus for extruding a ceramic molding as in claim 1, said pressure screw part being provided on a downstream end with a shaft bearing of a substantially circular cross section connected to the pressure screw part.

13. An apparatus for extruding a ceramic molding as in claim 1, said second lead comprising an even number of threads.

14. An apparatus for extruding a ceramic molding as in claim 1, said molding die is configured to produce a ceramic molding having a honeycomb structure.

15. An apparatus for extruding a ceramic molding as in claim 1, wherein a tapered resistance pipe whose inner diameter is reduced toward the molding die is provided between the screw extruder and the molding die.

16. An apparatus for extruding a ceramic molding as in claim 1, wherein said lead has a substantially constant outer diameter along said diffusion screw part, including along said diameter reducing part.

\* \* \* \* \*